US009555673B2

(12) United States Patent
Clayton et al.

(10) Patent No.: US 9,555,673 B2
(45) Date of Patent: *Jan. 31, 2017

(54) TIRE AIR PRESSURE OPTIMIZATION SYSTEM FOR IMPROVING TREAD WEAR

(71) Applicants: COMPAGNIE GENERALE DES ETABLISSEMENTS MICHELIN, Clermont-Ferrand (FR); MICHELIN RECHERCHE et TECHNIQUE S.A., Granges-Paccot (CH)

(72) Inventors: William Bennett Clayton, Simpsonville, SC (US); Dave Michael McKibben, Fountain Inn, SC (US); Zachary Alexander Merrill, Greenville, SC (US); Lawrence Otis Williamson, Simpsonville, SC (US); Wayne Carl Yount, Greer, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/710,708

(22) Filed: May 13, 2015

(65) Prior Publication Data
US 2015/0239303 A1    Aug. 27, 2015

Related U.S. Application Data

(63) Continuation of application No. 13/877,063, filed as application No. PCT/US2010/050967 on Sep. 30, 2010, now Pat. No. 9,045,012.

(51) Int. Cl.
*B60C 23/00* (2006.01)
*G01C 17/00* (2006.01)
*G01L 17/00* (2006.01)

(52) U.S. Cl.
CPC ............ *B60C 23/002* (2013.01); *G01L 17/00* (2013.01)

(58) Field of Classification Search
CPC .................................................. B60C 23/002
USPC ............. 701/36; 73/7–9, 146, 146.2, 146.5; 152/450–458; 703/1, 3, 7
See application file for complete search history.

(56) References Cited

U.S. PATENT DOCUMENTS

| 4,114,279 | A | * | 9/1978 | Johnson | G01B 5/0025 33/203 |
| 5,982,279 | A | * | 11/1999 | Tominaga | B60C 23/062 340/442 |
| 6,083,268 | A | | 7/2000 | Kelsey | |
| 6,488,064 | B1 | | 12/2002 | Radulescu | |

(Continued)

OTHER PUBLICATIONS

Supplementary European Search Report dated Oct. 2-16, 2011 for application No. EP 10 85 8000.

*Primary Examiner* — Jerrah Edwards
*Assistant Examiner* — Majdi Alsomiri
(74) *Attorney, Agent, or Firm* — Dority & Manning, P.A.

(57) ABSTRACT

A system is provided for automatically adjusting the air pressure of a tire based on variations in loading to improve tread wear. For a particular loading of the tire, the system provides for the determination of a preferred air pressure setting designed to minimize tread wear. This preferred air pressure, $P_p$, is determined from an analysis of the longitudinal stresses that occur within the contact patch of the tread.

9 Claims, 2 Drawing Sheets

(56) References Cited

U.S. PATENT DOCUMENTS

| | | | | |
|---|---|---|---|---|
| 6,539,788 B1* | 4/2003 | Mancosu | ................ | B60C 19/00 |
| | | | | 73/146 |
| 7,265,659 B2* | 9/2007 | Claussen | ............... | B60C 23/003 |
| | | | | 137/225 |
| 7,343,789 B2* | 3/2008 | Fujisawa | ................ | G01B 11/25 |
| | | | | 73/146 |
| 7,743,653 B2* | 6/2010 | Stommel | ................ | B60C 11/00 |
| | | | | 152/152.1 |
| 8,065,911 B2* | 11/2011 | Taylor | ................... | G01L 17/005 |
| | | | | 73/146 |
| 2004/0107081 A1 | 6/2004 | Miyori | | |
| 2005/0139000 A1* | 6/2005 | Walenty | ............... | B60C 23/061 |
| | | | | 73/146.5 |

\* cited by examiner

TIRE AIR PRESSURE OPTIMIZATION SYSTEM FOR IMPROVING TREAD WEAR

FIELD OF THE INVENTION

The present invention relates to a system for automatically increasing or decreasing the air pressure of a tire based on the changes in its loading so as to improve the wear of the tread.

BACKGROUND OF THE INVENTION

Commercial vehicles typically transport loads that can vary substantially in amount between different loads. When maintained at a relatively constant air pressure, the tire on such a vehicle will undergo changes to the shape of the contact patch as the loading is varied. As a result, the wear life of the tire's tread will be adversely affected.

Systems have been developed that allow for the addition of air to a tire in order to maintain a preset pressure. For example, commercial vehicles such as heavy duty truck and trailer combinations may be equipped with an air source and pressurized air storage systems for adding air to one or more tires if the measured air pressure falls below a predetermined value. In addition, systems have been provided for determining the load on a given axle based upon, e.g., the air spring operating pressure. However, none of these systems provide for automatically increasing and decreasing tire air pressure depending upon changes in the loading of the tire as the vehicle is used, much less provide for adjusting the pressure of the tires to a specific pressure based on loading in order to optimize the life of the tread.

In addition to variations in loads, the construction and positioning of tires used on commercial vehicles can also vary substantially. Commercial tires come in a variety of constructions and can include e.g., ribbed and non-ribbed tread. For a tractor and trailer combination, tire positions can include steer, drive, tag, and trailer positions. The impact on tread wear due to variations in loads will likely not be uniform between tires of different construction or between tires at different positions on a commercial vehicle. As a result, with load variations, the changes in air pressure required to minimize changes in the contact patch and improve tread wear will likely vary between the different tires and/or positions on the vehicle.

Manually adjusting tire air pressure based on changes in loading is not practical for a variety of reasons. Commercial vehicles may include a large number of tires; a well known example in North America includes the eighteen tires of the frequently used heavy duty tractor and trailer combinations. Manually inflating or deflating the trailer and/or drive tires each time a loading of the vehicle occurs would be time consuming and impractical.

A practice commonly followed by commercial vehicle operators is to employ a single, predetermined air pressure for all loads regardless of the variations between the loads. For example, a fleet operator may attempt to maintain all trailer tires above a certain minimum pressure setting but within the maximum pressure limit for a particular tire. The minimum pressure setting can be selected based on the minimum pressure recommended by e.g., guidelines provided by the Tire and Rim Association for the maximum load expected to be applied to the tire. Unfortunately, as previously stated, this constant approach is deleterious to tread life as changes in the load will cause variations in the contact patch. In addition, aside from the above described problems of a constant pressure approach, the pressure recommendations provided by the Tire and Rim Association are not based upon the optimization of tread wear for a given tire loading and do not suggest how such pressures might be determined.

Accordingly, a system for automatically adjusting the air pressure of a tire based on changes in loading is needed. More particularly, a system that improves tread wear performance by automatically adjusting the air pressure to a preferred air pressure as variations in loading of the tire occur would be very useful.

SUMMARY OF THE INVENTION

Aspects and advantages of the invention will be set forth in part in the following description, or may be obvious from the description, or may be learned through practice of the invention.

In one exemplary aspect, a method for regulating the air pressure in a tire is provided. The tire includes a tread and defines lateral and longitudinal directions. The method includes dividing the tread of the tire into multiple zones along the lateral direction, the multiple zones including a shoulder zone along each shoulder of the tire and one or more intermediate zones between the shoulder zones; selecting a range of tire air pressures and a range of tire loads; determining, for a load $L_i$ in the selected range of tire loads, the average longitudinal stress a, in each of the zones over the selected range of tire air pressures; identifying, from the selected range of tire air pressures, a preferred air pressure $P_p$ for the load $L_i$, wherein the preferred air pressure $P_p$ is the pressure at which both i) the average longitudinal stress $\sigma_{x\text{-}avg}$ for all of the zones is minimized and ii) the average longitudinal stress $\sigma_{x\text{-}avg}$ for each of the intermediate zones is maintained at or above a predetermined threshold longitudinal stress $\sigma_{x\text{-}th}$; repeating, over the selected range of tire loads $L_i$, the steps of determining and identifying so as to provide a correlation of the preferred air pressures $P_p$ corresponding to multiple loads $L_i$ for the selected range of tire loads; ascertaining an actual or anticipated tire load $L_a$ on a vehicle; and adjusting tire air pressure during vehicle use to the preferred air pressure $P_p$ for the tire load $L_a$ using the correlation from the step of repeating.

For the load $L_i$, the step of identifying may include eliminating from the selected range of air pressures all pressures at which the average longitudinal stress $\sigma_{x\text{-}avg}$ for any zone is less than the threshold longitudinal stress $\sigma_{x\text{-}th}$ and, if there is no pressure at which the average longitudinal stress $\sigma_{x\text{-}avg}$ for any zone is less than the threshold longitudinal stress $\sigma_{x\text{-}th}$, then eliminating from the selected range of air pressures all pressures at which the average longitudinal stress $\sigma_{x\text{-}avg}$ for either of the shoulder zones is less than the threshold longitudinal stress $\sigma_{x\text{-}th}$; calculating S, the sum of the squares of the average longitudinal stress $\sigma_{x\text{-}avg}$, of each zone, for each of the pressures remaining in the selected range of air pressures after the step of eliminating; and selecting, from the pressures remaining in the selected range of air pressures after the step of eliminating, the preferred air pressure $P_p$ as the greater of either a) the air pressure having the smallest value of S or b) the air pressure that is the minimum air pressure $P_{min}$ recommended for the load $L_i$.

This exemplary method may further include identifying the highest load $L_{Pmin\text{-}lowest}$ for which the preferred pressure $P_p$ is equal to the minimum pressure desired $P_{min\text{-}lowest}$ for the tire and, if such a load exists, then selecting the minimum pressure desired $P_{min\text{-}lowest}$ as the preferred pressures $P_p$ for all loads below the load $L_{Pmin\text{-}lowest}$.

The shoulder zones can be defined, for example, to include shoulder ribs located along the shoulders of the tire. Each of the one or more intermediate zones can be defined, for example, as one of the ribs located between the shoulder ribs of the tire. The selected range of air pressures can be defined as the pressures between about 5 psi less than the minimum air pressure desired, $P_{min-lowest}$, for the tire to about the maximum sidewall pressure for the tire. The selected range of loads can be defined as the loads between about the minimum operating load of the tire to about the maximum sidewall load of the tire.

The step of determining the average longitudinal stresses $\sigma_x$ can include measuring longitudinal stresses $\sigma_x$ in one or more of the zones. Alternatively, the step of determining the average longitudinal stresses $\sigma_x$ can include calculating the longitudinal stresses $\sigma_x$ in one or more of the zones. The step of determining the average longitudinal stresses $\sigma_x$ can include measuring or calculating the net force of contact per zone and dividing by the area of the zone in contact with the ground.

The step of adjusting the tire pressure can include increasing the air pressure, decreasing the air pressure, or both. The step of ascertaining the actual load can include measuring the load carried by the vehicle or, alternatively, the air pressure can be adjusted based on an anticipated tire load. This exemplary method of the invention may include measuring tire air pressure during vehicle use before the step of adjusting.

The present invention applies to different types of tires and different positions on a vehicle as well. For example, the tire may be a non-ribbed tire or a ribbed tire. By way of further example, the tire may be used on a trailer and a threshold longitudinal stress $\sigma_{x-th}$, in the range of about −0.10 bar to about −0.12 bar is typical for many applications. Drive tires, in contrast, see a significant longitudinal stress $\sigma_{drive}$ coming from the drive torque of the motor; it is thus appropriate to offset the trailer tire threshold by this amount for the drive tires. The range of $\sigma_{drive}$ varies significantly depending on engine, load, and other factors. As another example, the tire may be used on a tractor in the steer position and a threshold longitudinal stress $\sigma_{x-th}$ in the range of about −0.04 bar to about −0.06 bar is typical for this application.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
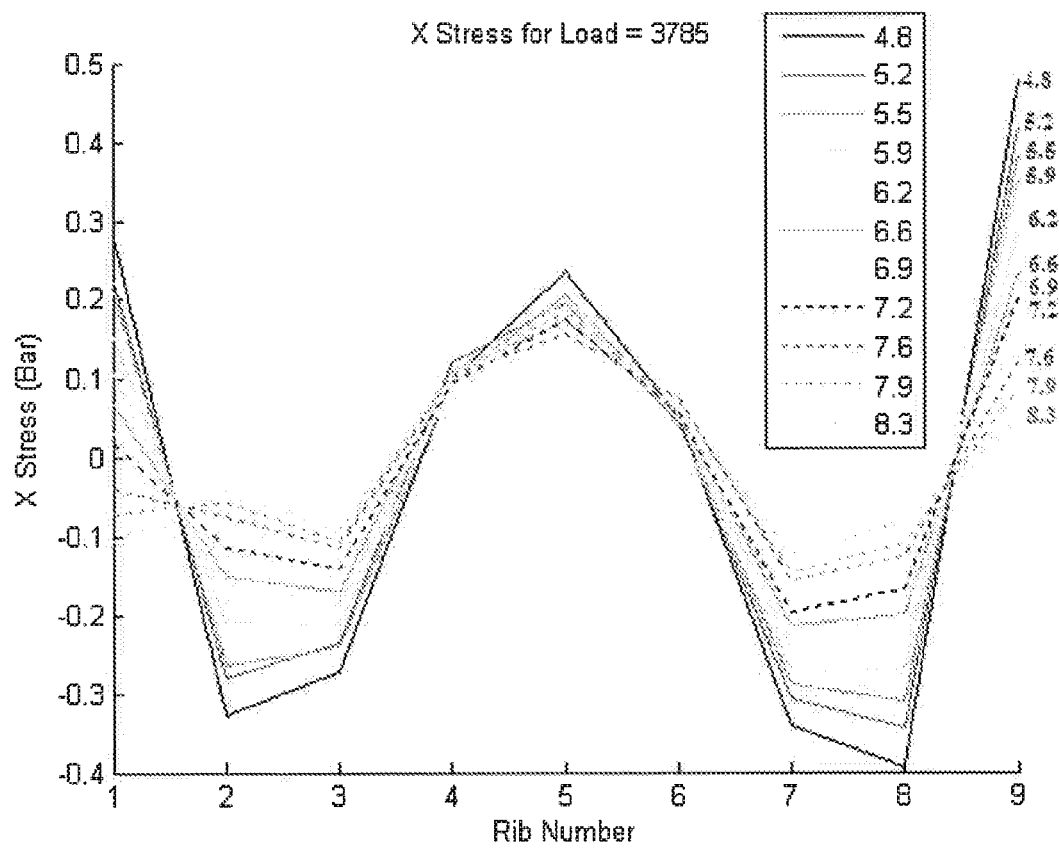
FIG. 1 illustrates the results of an exemplary determination of longitudinal stress as calculated for each rib of an XOne® XTE tire over a range of pressures for a given tire loading.

The present invention relates to a system for automatically adjusting the air pressure of a tire based on variations in loading to improve tread wear. For a particular loading of the tire, the system provides for the determination of a preferred air pressure setting designed to minimize tread wear. This preferred air pressure, $P_p$, is determined from an analysis of the longitudinal stresses that occur within the contact patch of the tread as more fully described below. For purposes of describing the invention, reference now will be made in detail to embodiments and aspects of the invention, one or more examples of which are illustrated in the drawings. Each example is provided by way of explanation of the invention, not limitation of the invention. In fact, from the teachings disclosed herein, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

"Longitudinal" or "longitudinal direction" as used herein with reference to the tire tread means a direction perpendicular to axis of rotation of the tire, tangent to the circumferential direction of tread, and parallel to the ground. The use of "x" or "x-direction" is also used to refer to the longitudinal direction.

"Lateral" as used herein refers to a direction parallel to the axis of rotation of the tire and perpendicular to the longitudinal direction.

"Longitudinal stress" as used herein refers to the mechanical stress occurring in the tire tread as determined by dividing the area of the tread in contact with the ground (or a zone/section thereof) by the net force acting on such area along the x or longitudinal direction at a given air pressure and loading of the tire. As will be understood by one of ordinary skill in the art, the amount of longitudinal stress can be determined through measurement or modeling using e.g., finite element analysis. The average longitudinal stress within a given zone of the tread will be referred to herein with "$\sigma_{x-avg}$" as is more fully discussed below. Positive values of $\sigma_{x-avg}$ denote the direction of travel as the tire moves along the ground or surface.

$P_{min}$ as used herein refers to the minimum air pressure recommended for the tire for a given loading. The Tire and Rim Association provides guidelines indicating the minimum air pressure that should be used for each specific tire.

$P_{min-lowest}$ as used herein is defined as the lowest pressure desired for the tire in question. $P_{min-lowest}$ is determined by factors other than tire wear performance and typically includes tire reinflation time, tire lateral firmness, and other considerations. It is always greater than or equal to $P_{min}$.

As previously stated, a load-induced variability in the size of a tire's contact patch will contribute to unfavorable tread wear. The size of the contact patch is also directly affected by the amount of air pressure in the tire. To improve tread wear, load-induced variations in the size of the contact patch can be controlled by adjusting the tire air pressure within the minimum and maximum limits of air pressure for a particular tire and its loading. More importantly, as will now be described by examples, the present invention provides a system for determining a preferred pressure $P_p$ for optimizing tread wear at a given tire loading. As the loading of a tire changes based on e.g., changes in vehicle cargo, tire air pressure can be automatically adjusted (by deflation or inflation) to the preferred air pressure $P_p$ for minimizing tread wear for a particular construction, position, and loading of the tire.

According to an exemplary aspect of the present invention, the tread of the tire is divided into zones along the lateral direction. These zones can be defined by e.g., features in the tread. For a ribbed tire, the zones can be divided among ribs located along the shoulders of the tire and the ribs that are intermediate thereof. For a non-ribbed tire, the tread pattern can be arbitrarily divided along the lateral direction into zones so as to create different tread regions for purposes of analysis. By way of example, the tread region could be divided into a shoulder zone located along each shoulder of the tire and one or more intermediate zones located between the shoulder zones. Preferably, the zones are of roughly equal width but variations can also be used.

Within each zone, the value and direction of the average longitudinal stress $\sigma_{x\text{-}avg}$ provides a strong indicator of the wear potential for the portion of the tread defined by the zone. Very high values of the average longitudinal stress typically lead to a rapid rate of tread wear while large negative values of the average longitudinal stress are associated with a propensity for irregular tread wear. Accordingly, to minimize tread wear for a given construction, loading, and position of the tire, the air pressure should be modulated or adjusted so that the value of the average longitudinal stress $\sigma_{x\text{-}avg}$ is both minimized and simultaneously maintained above a threshold value of longitudinal stress, referred to herein as $\sigma_{x\text{-}th}$. The tire air pressure at which this desired average longitudinal stress $\sigma_{x\text{-}avg}$ occurs is the preferred air pressure $P_p$ for a given loading, position, and construction of the tire.

The value of threshold longitudinal stress $\sigma_{x\text{-}th}$ that should be applied will depend upon the design of the tire and the intended application such as the tire position on a heavy duty, tractor and trailer combination. The inventors have found that for heavy duty trailer tires, a value in the range of about −0.10 bars to −0.12 bars is typical for many applications. Drive tires, in contrast, see a significant positive longitudinal stress $\sigma_{drive}$ coming from the drive torque of the motor; it is thus appropriate to offset the trailer tire threshold by $\sigma_{drive}$ for the drive tires. The range of $\sigma_{drive}$ varies significantly depending on engine, load, application and other factors. For steer tires on a heavy duty tractor, which see a very different usage condition, a range of about −0.04 bars to 0.06 bars is typical for many applications. Using the teachings disclosed herein, it will be understood that other ranges may be developed depending upon a variety of factors such as e.g., the intended application of the tire.

The value and direction of the average longitudinal stress $\sigma_{x\text{-}avg}$ for each zone of the tire can be determined by calculation or measurement as will be understood by one of ordinary skill in the art. For purposes of this exemplary aspect of the present invention, the average longitudinal stress $\sigma_{x\text{-}avg}$ for each zone of the tread is determined by measuring or calculating the net force of contact per zone and dividing by the area of the zone that is in contact with the ground as the tire rotates through the contact patch. It should be noted that for some designs, the tire may be provided with ribs or zones that are intended to be sacrificial and specifically designed to have large values of longitudinal stress. Such sacrificial cases should be excluded from the zones that are analyzed according to the system set forth herein.

For a given tire construction and position, the value of the preferred air pressure $P_p$ will vary depending upon changes in the load that is applied to the tire as e.g., the cargo of the vehicle is loaded or unloaded. To provide for automatic adjustment of the tire air pressure, a correlation is developed that relates the preferred air pressures $P_p$ with the range of loads anticipated for a particular tire construction and position. Using this correlation, the preferred air pressure $P_p$ can be readily determined based upon knowledge of the actual or anticipated load $L_a$ for the tire. The actual load $L_a$ can be readily determined using known on-board measurement systems such as, for example, currently available systems that determine weight based on measurements taken from the vehicle's suspension system. Knowing this preferred pressure $P_p$, the air pressure of the tire can be adjusted by inflating or deflating the tire until the preferred air pressure $P_p$ is obtained for a specific loading $L_a$.

The correlation is created by selecting a range of tire air pressures and a range of tire loads that are anticipated and proper for the tire in question. For example, the selected range of loads may span from an unloaded tire up to the maximum loading allowed for the particular construction of the tire being considered. As will be understood by one of skill in the art, for each tire model provided by manufacturers, a maximum loading for the tire is typically identified on the sidewall of the tire. This maximum limit can be selected as the upper end of the selected load range while an unloaded or zero load can be selected for the lower limit. Other ranges may also be selected, provided such are within manufacturer and/or industry recommended limits.

Similarly, a pressure range for creation of the correlation is selected. For example, for purposes of creating the correlation, a pressure range of 5 psi below the minimum pressure desired $P_{min\text{-}lowest}$ can be used as the lower end of the range while the maximum air pressure recommended by the Tire and Rim Association can be used for the upper end of the range. Other ranges may also be selected.

Next, over the selected range of air pressures and loads, the average longitudinal stress $\sigma_x$ in each zone of the tire's tread is determined. More particularly, for a given load $L_i$ within the selected range of tire loads, the average longitudinal stress $\sigma_{x\text{-}avg}$ is determined for each zone of the tire over the entire selected pressure range. Suitable increments of pressure within the selected air pressure range may be used. For example, for a given load $L_i$, the average longitudinal stress $\sigma_{x\text{-}avg}$ can determined for each pressure between the minimum and maximum pressures in the selected air pressure range using increments of 5 psi. Other increments may be used as well.

Using this stress data for the load $L_i$, a preferred air pressure $P_p$ from the selected air pressure range is identified for load $L_i$. The preferred air pressure $P_p$ is identified as the air pressure at which each of the following two conditions is simultaneously satisfied: i) the average longitudinal stress $\sigma_{x\text{-}avg}$ for all zones is minimized; and ii) the average longitudinal stress $\sigma_{x\text{-}avg}$ for each of the intermediate zones is maintained at or above a predetermined threshold longitudinal stress $\sigma_{x\text{-}th}$.

In order to identify this preferred pressure $P_p$ for the load $L_i$, all air pressures that meet the following condition, referred to as Criterion 1, are eliminated from the selected air pressure range.

Criterion 1: The average longitudinal stress $\sigma_{x\text{-}avg}$ for any zone of the tread is less than the predetermined threshold longitudinal stress $\sigma_{x\text{-}th}$.

If at least one air pressure in the selected air pressure range is not eliminated by Criterion 1, then for each of the remaining non-eliminated air pressure(s), the sum of the squares of the average longitudinal stress $\sigma_{x\text{-}avg}$, S, is calculated for each of the zones. This calculation is set forth in the following equation:

$$S \equiv \sum_{zones} \sigma_x^2 \qquad (1)$$

The preferred pressure $P_p$ is selected as the greater of either a) the air pressure having the smallest value of S or b) the minimum recommended air pressure $P_{min}$ for the load $L_i$. For example, as set forth above, the Tire and Rim Association provides a minimum recommended air pressure $P_{min}$ for specific tires based on the loading of the tire.

If all air pressures in the selected air pressure range would be eliminated by the application of Criterion 1, then the following condition, referred to as Criterion 2, is applied to all air pressures in the selected air pressure range. More particularly, now all air pressures in the selected air pressure range that meet the following condition, referred to herein as Criterion 2, are eliminated from the selected air pressure range.

Criterion 2: The average longitudinal stress $\sigma_{x\text{-}avg}$ for either of the shoulder zones is less than the predetermined threshold longitudinal stress $\sigma_{x\text{-}th}$.

If at least one air pressure in the selected air pressure range is not eliminated by Criterion 2, then for each of the remaining, non-eliminated air pressure(s), equation 1 is used to calculate 8, the sum of the squares of the average longitudinal stress $\sigma_{x\text{-}avg}$, for each of the zones as set forth in equation 1. The preferred pressure $P_p$ is now selected as the greater of either a) the air pressure having the smallest value of S or b) the minimum recommended air pressure $P_{min}$ for the load $L_i$.

If all air pressures in the selected air pressure range would be eliminated by Criteria 1 and 2, then for each of the air pressures in the selected air pressure range, S is calculated for each of the zones as set forth in equation 1. As before, the preferred pressure $P_p$ is now selected as the greater of either a) the air pressure having the smallest value of S or b) the minimum recommended air pressure $\rho_{min}$ for the load $L_i$.

At this point, the correlation exists as a data set that contains the preferred pressure $P_p$ for a given load $L_i$. To complete the correlation, the above described process of applying criterion 1 and 2 over all pressures in the selected pressure range is now repeated for all loads in the selected range of loads. By way of example, preferably the selected range of loads spans from the minimum operating load of the tire to the maximum load allowed for the tire. In order to determine $P_p$ for this range of loads, suitable increments of tire load within the selected range of loads may used such as from 0 to 100 percent of the maximum load in increments of 10 percent. Other increments may be used as well.

Once Criteria 1 and 2 have been applied for all pressures in the selected pressure range and to all loads $L_i$ within the selected range of loads, the correlation now contains a data set of the preferred pressures $P_p$ for all the loads within the selected range of loads—subject to one additional modification. To finalize the correlation, the highest load for which the preferred pressure $P_p$ is equal to the minimum desired pressure $P_{min\text{-}lowest}$ is identified. If such a load exists (referred to herein as $L_{Pmin\text{-}lowest}$), then for all loads below $L_{Pmin\text{-}lowest}$ the preferred pressure $P_p$ is set to the minimum pressure desired $P_{min\text{-}lowest}$ for the tire. The correlation now provides a data set of the preferred pressures $P_p$ for a range of loads applied to the tire. Using the teachings disclosed herein, one of skill in the art will understand that the correlation can be maintained as a reference table, model, equation, or the like. Interpolation between values may also be applied.

Using the correlation of preferred pressures $P_p$ and loads as described above, the air pressure of a tire subjected to varying loads can be readily adjusted based on changes in the load. After measuring the actual load $L_a$ (or predicting the anticipated load) on a tire and its actual air pressure, reference can be made to the correlation to determine if the tire's air pressure is equal to the preferred air pressure $P_p$ for the current load. If not, the tire can by inflated or deflated as needed to match the tire's air pressure to the preferred air pressure $P_p$. A correlation can be developed for each tire construction and position.

As stated, equipment is already available that can automatically measure tire air pressure and load while the tire is in use on the vehicle. Accordingly, by incorporating the correlation into an appropriate on-board controller as will be understood by one of ordinary skill in the art using the teachings herein, a vehicle can be readily provided with equipment for automatically adjusting tire air pressure as the loading is changed so as to improve tread wear performance.

By way of example, the above exemplary method was applied to the XOne® XTE, a commercial truck tire having nine ribs. A size of 445/50R22.5 and a trailer position were selected. However, as set forth above, it should be understood that the present invention may be applied to all tire positions and tires of other constructions.

For purposes of creating the correlation, a pressure range from 70 psi to 120 psi was selected, which represents a range from 5 psi less than the minimum pressure desired $P_{min\text{-}lowest}$=75 psi for this tire to the maximum recommended pressure for this tire. Increments of about 5 psi were used for creating the correlation. A load range was also selected that spanned from an unloaded trailer ("0%"), through the maximum legal axle load ("100%") allowed under the laws of the United States, and up to the maximum legal side wall load ("131%"). This load range was divided into 14 approximately equal increments. The loads and pressures used are set forth in Table 1.

TABLE 1

| Pressure | | | Load | | | |
|---|---|---|---|---|---|---|
| PSI | kPa | Bar | % load | DaN | Kg | lbs |
| 120 | 830 | 8.3 | 131.3% | 4719 | 4625 | 10196 |
| 115 | 790 | 7.9 | 120% | 4382 | 4294 | 9467 |
| 110 | 760 | 7.6 | 110% | 4084 | 4002 | 8823 |
| 104 | 720 | 7.2 | 100% | 3785 | 3709 | 8178 |
| 100 | 690 | 6.9 | 90% | 3487 | 3417 | 7533 |
| 96 | 660 | 6.6 | 80% | 3188 | 3124 | 6888 |
| 90 | 620 | 6.2 | 70% | 2890 | 2832 | 6243 |
| 86 | 590 | 5.9 | 60% | 2591 | 2539 | 5598 |
| 80 | 550 | 5.5 | 50% | 2293 | 2247 | 4953 |
| 75 | 520 | 5.2 | 40% | 1994 | 1954 | 4308 |
| 70 | 480 | 4.8 | 30% | 1696 | 1662 | 3663 |
| | | | 20% | 1397 | 1369 | 3018 |
| | | | 10% | 1099 | 1077 | 2373 |
| | | | 0% | 800 | 784 | 1728 |

For each tire load and air pressure, the longitudinal stresses were calculated using finite element analysis under free rolling conditions. FIG. 1 provides an example of the longitudinal stresses that were calculated over the nine ribs for a load of 3709 kilograms.

Figure 2:
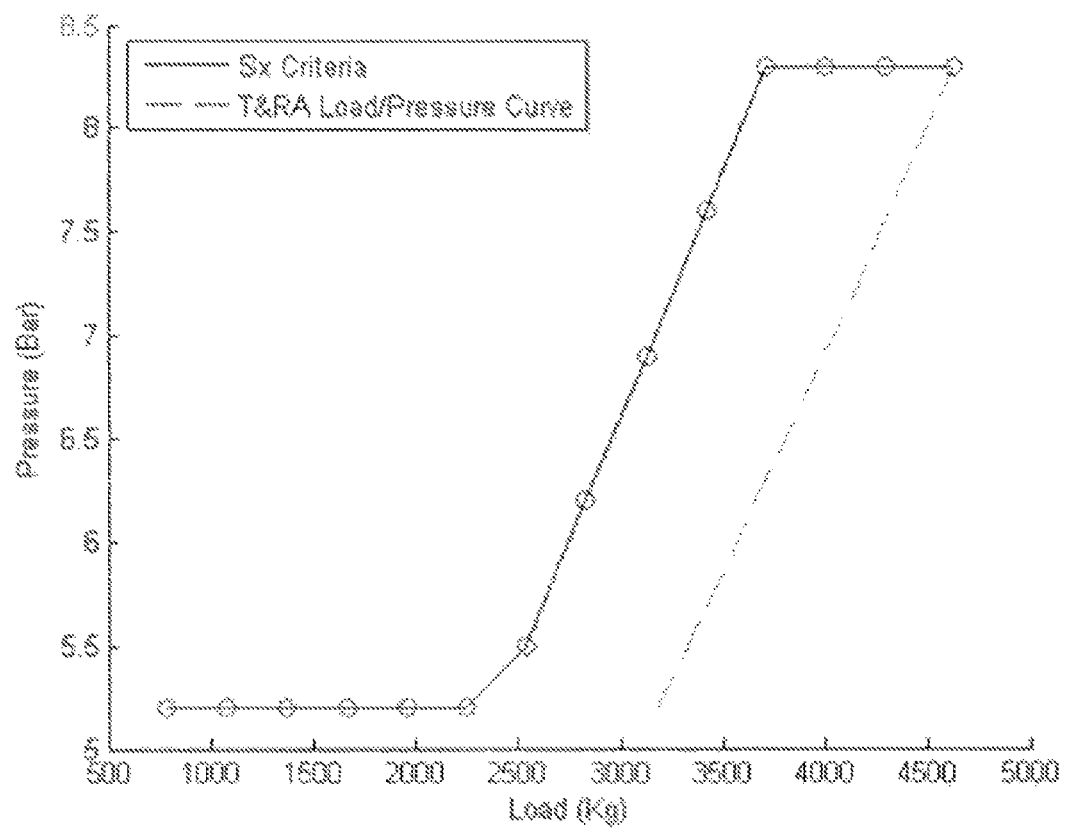
FIG. 2 illustrates a preferred pressure $P_p$ curve and a $P_{min}$ curve over a range of loads for an XOne® XTE tire as further described below. Pressures recommended by the Tire and Rim Association are also illustrated.

Using a threshold longitudinal stress $\sigma_{x\text{-}th}$ of −0.11 bar, the exemplary method described above was applied to arrive at a data set of preferred pressures $P_p$ for the selected range of loads. A plot of the preferred pressures $P_p$ against the selected range of loads is set forth in FIG. 2. As shown therein, for the purposes of optimizing tread wear, the preferred pressure $P_p$ curve (illustrated with a straight line in FIG. 2 as the "Sx Criteria" curve) varies significantly from the air pressures recommended by the Tire and Rim Association load inflation table (illustrated with a dashed line in FIG. 2 as the "T&RA load pressure" curve). More specifically, the preferred pressure $P_p$ curve is shifted to higher pressures and has a higher slope ($2.60 \times 10^{-3}$ bar/Kg) than the T&RA curve ($2.14 \times 10^{-3}$ bar/Kg). When the trailer load is above 60 percent, the preferred pressure curve $P_p$ recommends substantially higher pressures, up to 2.1 bars. While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for regulating air pressure of a tire on a vehicle, the tire having shoulders, a tread with a ground contacting portion, and defining lateral and longitudinal directions, the lateral direction being parallel to an axis of rotation of the tire, the longitudinal direction being perpendicular to the axis of rotation of the tire, the method comprising:

ascertaining an actual or anticipated tire load $L_a$ on the tire;

selecting, from a correlation of preferred air pressures $P_p$ for a range of multiple tire loads $L_i$, on the tire, a preferred air pressure $P_p$ for the actual or anticipated load $L_a$ on the tire; and adjusting the air pressure of the tire while on the vehicle to the preferred air pressure $P_p$ for the actual or anticipated tire load $L_a$; and wherein determination of the correlation of preferred air pressures $P_p$ comprises:

dividing the tread of the tire into multiple zones along the lateral direction, the multiple zones including a shoulder zone along each shoulder of the tire and one or more intermediate zones between the shoulder zones;

selecting a range of tire air pressures;

determining, for a load $L_i$, in the range of multiple tire loads $L_i$, the average longitudinal stress $\sigma_x$ in each of the zones over the selected range of tire air pressures;

identifying, from the selected range of tire air pressures, the preferred air pressure $P_p$ for the load $L_i$, wherein the preferred air pressure $P_p$ is the pressure at which both i) the average longitudinal stress $\sigma_{x\text{-}avg}$ for all of the zones is minimized and ii) the average longitudinal stress $\sigma_{x\text{-}avg}$ for each of the intermediate zones is maintained at or above a predetermined threshold longitudinal stress $\sigma_{x\text{-}th}$; and repeating, over the range of multiple tire loads $L_i$, the determining and identifying so as to provide the correlation of the preferred air pressures $P_p$.

2. The method for regulating air pressure of a tire on a vehicle in claim 1, wherein adjusting the air pressure of the tire comprises increasing the air pressure, decreasing the air pressure, or both.

3. The method for regulating air pressure of a tire on a vehicle as in claim 1, wherein ascertaining the actual load comprises measuring a load carried by the vehicle.

4. The method for regulating air pressure of a tire on a vehicle as in claim 1, wherein the range of multiple tire loads $L_i$ is defined as the loads between about a minimum operating load of the tire to about a maximum sidewall load of the tire.

5. The method for regulating air pressure of a tire on a vehicle as in claim 1, further comprising measuring the air pressure of the tire on the vehicle before the adjusting.

6. The method for regulating air pressure of a tire on a vehicle as in claim 1, wherein the tire is a non-ribbed tire.

7. The method for regulating air pressure of a tire on a vehicle as in claim 1, wherein the identifying comprises, for the load $L_i$:

eliminating from the selected range of air pressures all pressures at which the average longitudinal stress $\sigma_{x\text{-}avg}$ for any zone is less than the predetermined threshold longitudinal stress $\sigma_{x\text{-}th}$ and, if there is no pressure at which the average longitudinal stress $\sigma_{x\text{-}avg}$ for any zone is less than the threshold longitudinal stress $\sigma_{x\text{-}th}$, then eliminating from the selected range of air pressures all pressures at which the average longitudinal stress $\sigma_{x\text{-}avg}$ for either of the shoulder zones is less than the threshold longitudinal stress $\sigma_{x\text{-}th}$;

calculating S, the sum of the squares of the average longitudinal stress $\sigma_{x\text{-}avg}$ of each of the zones, for each of the pressures remaining in the selected range of air pressures after the eliminating; and selecting, from the pressures remaining in the selected range of air pressures after the eliminating, the preferred air pressure $P_p$ as the greater of either a) the air pressure having the smallest value of S or b) the air pressure $P_{min}$ that is the minimum recommended for the load $L_i$.

8. A system for adjustment of tire air pressure on a vehicle, comprising:

equipment for measuring the pressure of at least one tire on the vehicle;

equipment for adjusting the pressure of at least one tire on the vehicle; and a controller configured for ascertaining an actual or anticipated tire load $L_a$ on the tire;

selecting, from a correlation of preferred air pressures $P_p$ for a range of multiple tire loads $L_i$ on the tire, a preferred air pressure $P_p$ for the actual or anticipated load $L_a$ on the tire; and adjusting the air pressure of the tire while on the vehicle to the preferred air pressure $P_p$ for the actual or anticipated tire load $L_a$;

wherein determination of the correlation of preferred air pressures $P_p$ comprises:

dividing the tread of the tire into multiple zones along the lateral direction, the multiple zones including a shoulder zone along each shoulder of the tire and one or more intermediate zones between the shoulder zones;

selecting a range of tire air pressures;

determining, for a load $L_i$ in the range of multiple tire loads $L_i$, the average longitudinal stress $\sigma_x$ in each of the zones over the selected range of tire air pressures;

identifying, from the selected range of tire air pressures, the preferred air pressure $P_p$ for the load $L_i$, wherein the preferred air pressure $P_p$ is the pressure at which both i) the average longitudinal stress $\sigma_{x\text{-}avg}$ for all of the zones is minimized and ii) the average longitudinal stress $\sigma_{x\text{-}avg}$ for each of the intermediate zones is maintained at or above a predetermined threshold longitudinal stress $\sigma_{x\text{-}th}$; and repeating, over the range of multiple tire loads $L_i$, the determining and identifying so as to provide the correlation of the preferred air pressures $P_p$.

9. The system for adjustment of tire air pressure on a vehicle as in claim 8, wherein the identifying comprises, for the load $L_i$:

eliminating from the selected range of air pressures all pressures at which the average longitudinal stress $\sigma_{x\text{-}avg}$ for any zone is less than the predetermined threshold longitudinal stress $\sigma_{x\text{-}th}$ and, if there is no pressure at which the average longitudinal stress $\sigma_{x\text{-}avg}$ for any zone is less than the threshold longitudinal stress $\sigma_{x\text{-}th}$, then eliminating from the selected range of air pressures all pressures at which the average longitudinal stress $\sigma_{x\text{-}avg}$ for either of the shoulder zones is less than the threshold longitudinal stress $\sigma_{x\text{-}th}$;

calculating S, the sum of the squares of the average longitudinal stress $\sigma_{x\text{-}avg}$, of each of the zones, for each of the pressures remaining in the selected range of air pressures after the eliminating; and selecting, from the pressures remaining in the selected range of air pressures after the eliminating, the preferred air pressure $P_p$ as the greater of either a) the air pressure having the smallest value of S or b) the air pressure $P_{min}$ that is the minimum recommended for the load $L_i$.

* * * * *